US006559302B1

United States Patent
Shah et al.

(10) Patent No.: US 6,559,302 B1
(45) Date of Patent: May 6, 2003

(54) POLYMERIZATION OF MONO-AND DISACCHARIDES USING LOW LEVELS OF MINERAL ACIDS

(76) Inventors: Pankaj Shashikant Shah, 5 Sand St., Millwood, NY (US) 10546; Stuart Andrew Shaw Craig, 7 Robin Dr., Somers, NY (US) 10589; Christina Sue Morrill, 1090 E. Honey Hill Dr., Terre Haute, IN (US) 47802; Michael Torrey Wuesthoff, 8 Monticello Ct., Gales Ferry, CT (US) 06335

(*) Notice: Subject to any disclaimer, the term of this patent is extended or adjusted under 35 U.S.C. 154(b) by 0 days.

(21) Appl. No.: 09/381,467

(22) PCT Filed: Mar. 19, 1998

(86) PCT No.: PCT/US98/05468
§ 371 (c)(1),
(2), (4) Date: Nov. 18, 1999

(87) PCT Pub. No.: WO98/41545
PCT Pub. Date: Sep. 24, 1998

Related U.S. Application Data

(63) Continuation-in-part of application No. 08/820,115, filed on Mar. 19, 1997, now abandoned.

(51) Int. Cl.$^7$ ............................. C07H 1/00; C07H 3/00; C08B 37/00
(52) U.S. Cl. ....................................... 536/124; 536/126
(58) Field of Search ................................. 536/124, 126

(56) References Cited

U.S. PATENT DOCUMENTS

| | | | |
|---|---|---|---|
| 2,027,904 A | 1/1936 | Färber | 260/140 |
| 2,436,967 A | 3/1948 | Leuck | 536/126 |
| 2,719,179 A | 9/1955 | Mora et al. | 536/123 |
| 3,766,165 A | 10/1973 | Rennhard | 536/126 |
| 3,876,794 A | 4/1975 | Rennhard | 426/152 |
| 4,622,233 A | 11/1986 | Torris | 426/548 |
| 4,948,596 A | 8/1990 | Bunick et al. | 426/804 |
| 4,956,458 A | 9/1990 | Luo et al. | 536/127 |
| 4,965,354 A | 10/1990 | Yanaki et al. | 536/126 |
| 5,424,418 A | 6/1995 | Duflot | 536/123.1 |
| 5,493,014 A | 2/1996 | Carbouche | 123/13 |
| 5,573,794 A | 11/1996 | Duflot | 426/48 |

FOREIGN PATENT DOCUMENTS

| | | |
|---|---|---|
| CA | 2086207 | 9/1993 |
| EP | 0 380 248 | 1/1990 |
| EP | 0 473 333 A2 | 8/1991 |
| EP | 662 483 A1 | 7/1995 |
| JP | 1012761 B | 4/1987 |
| JP | 62-91501 A | 4/1987 |
| JP | 62-91502 A | 4/1987 |
| JP | 1012761 B | 3/1989 |
| JP | 1012762 B | 3/1989 |
| JP | 2-163101 | 6/1990 |
| JP | 5087083 B | 6/1990 |
| WO | 92/14761 | 9/1992 |

OTHER PUBLICATIONS

O.R. Fennema, Food Chemistry ($2^{nd}$ ed.), Marcel Dekker, Inc., NY 1985, p. 98.

(List continued on next page.)

Primary Examiner—James O. Wilson
Assistant Examiner—Everett White
(74) Attorney, Agent, or Firm—Thaddius J. Carvis

(57) ABSTRACT

Various polysaccharides are prepared by reacting glucose or glucose-containing materials such as hydrolyzed starch with a polyol such as sorbitol in the presence of mineral acids such as phosphoric, hydrochloric and/or sulfuric acid. In one embodiment, polydextrose is prepared by reacting glucose or glucose-containing materials such as hydrolyzed starch with a polyol such as sorbitol in the presence of low levels, i.e., from about 0.001% to about 0.09%, more narrowly from about 0.01% to about 0.06%, phosphoric acid. In other embodiments, other mineral acids or mixtures thereof may be employed. In alternate embodiments, a combination of mineral and organic carboxylic acids such as citric acid are employed. Because of the low levels of catalyst used in certain preferred embodiments, minimal or no off-flavors and little color are formed during the course of the reaction.

19 Claims, 1 Drawing Sheet

OTHER PUBLICATIONS

Figdor, S.K., and Bianchine, J.R., J. Agric. Food Chem. 31:389–393 (1983).

B.F.M. Kuster, Starch/Starke, vol. 42 pp. 314–321 (1990).

Murray, P.R. in Birch and Lindley, *Low–Calorie Products*, Elsevier, NY, 1988, pp. 84–100.

W. Pigman, The Carbohydrates. Chemistry, Biochemistry, and Physiology (Acadamic Press, NY, 1957, pp. 57–60.

W. Pigman and D. Horton, The Carbohydrates, Chemistry and Bilchemistry (Academic Press, NY. 1972, vol. 1A, pp. 175–186 and vol. IIA, p. 95.

A.E. Staley, F.D.A, Food Additive Petition § 172,841, Fed. Reg. 59:36204 vol. 59, No. 135, p. 36204 (1994) and text excerpts.

POLYMERIZATION OF MONO-AND DISACCHARIDES USING LOW LEVELS OF MINERAL ACIDS

RELATED APPLICATION

This application is a continuation-in-part of our U.S. patent application Ser. No. 08/820,115, filed Mar. 19, 1997, now abandoned.

TECHNICAL FIELD

This invention relates to the polymerization of glucose and other monosaccharides using mineral acids such as low levels of phosphoric acid to yield edible materials particularly suitable for food use.

With increased consumer demand for healthy, reduced-calorie food products, polymerized carbohydrate materials such as polydextrose have gained popularity in recent years as substitutes for conventional sweeteners, flour, and other starches in recipes, and as fat-sparing agents. Reduction of caloric density in food products using polydextrose, for example, can be significant because polydextrose delivers only about 1 kcal/gram, which is about 25% the value of glucose and 9% the value of fat (Figdor, S. K., and Bianchine, J. R., *J. Agric. Food Chem.* 1983, 31: 389–393). Yet polydextrose is a bland-tasting bulking agent that can add the mouthfeel, texture, and palatability of higher calorie carbohydrates to food without affecting the utilization of vitamins, minerals or essential amino acids that has plagued the use of some other sugar and fat replacers. In addition, in dental tests, polydextrose does not promote tooth decay or plaque formation, so it can be used in reduced-cariogenic confectioneries and the like. Use of polydextrose and related polysaccharides in food products to totally or partially replace higher calorie ingredients, and to augment artificial sweeteners replacing sugars, permit a dietetic food to retain its appetizing physical appearance, while contributing to the texture and eating quality of the food. (For a review of polydextrose, see Murray, P. R., in Birch, G. G., and Lindley, M. G., eds., *Low-Calorie Products*, Elsevier Applied Science, New York, 1988, chapter 7, pages 84–100.)

Water-soluble, highly branched polydextrose is now widely used as a bulking agent, formulation aid, humectant, and texturizer in frozen dairy compositions such as ice cream, ice milk, and other desserts; in baked goods such as cakes, cookies and pastries containing flour, and in baking mixes; and in icings, candy, syrups, toppings, sauces, gelatins, puddings, beverages, and chewing gum.

BACKGROUND OF THE INVENTION

Glucose is known to polymerize under acidic catalysis. Mora, for example, described the preparation of branched-chain carbohydrate polymers in U.S. Pat. No. 2,719,179. His process involved holding a saccharide or a mixture of saccharides in an inert solvent or diluent in the presence of a Lewis acid catalyst at a temperature of −80° C. to 110° C. He suggested that hydrochloric acid, phosphoric acid, phosphorous acid, sulfuric acid, aluminum chloride, zinc chloride, stannic chloride, boron trifluoride, antimony trichloride, or p-toluene sulfonic acid might be useful for the practice of his invention, although his examples employ only hydrochloric acid to polymerize dextrose.

Under acidic conditions at elevated temperatures, carbohydrates, especially monosaccharides, are vulnerable to a variety of reactions, including hydrolysis, dehydration, decomposition, and polymerization. Products, which tend to have yellow to brown colors and caramel-like odors, are complex mixtures of anhydro sugars, hydroxymethyl furfural and other furan compounds, levulinic acid, formic acid, soluble brown polymers, and insoluble humins. These reactions are described, for example, in W. Pigman, *The Carbohydrates, Chemistry, Biochemistry, and Physiology* (Academic Press, New York, 1957, pages 57 to 60); in W. Pigman and D. Horton, *The Carbohydrates, Chemistry and Biochemistry* (Academic Press, New York, 1972, volume IA, pages 175 to 186, and volume IIA, page 95); in O. R. Fennema, *Food Chemistry* (2nd ed., Marcel Dekker, Inc., New York, 1985, page 98); and in B. F. M. Kuster, Volume 42 of *Starch/Starke* (1990, pages 314–321). The reactions are difficult to control during acid-catalyzed polymerization of saccharides, where the object is a polymer having bland taste and low color.

In U.S. Pat. No. 2,436,967, Leuck described a series of experiments comparing catalysts or combinations of catalysts for the polymerization of sugars, preferably in a molten state. He found that alkaline salts could not be effectively used because they had a tendency to break down or destroy the dextrose, and that neutral salts were more effective than an acid as a catalyst for polymerization. He reported that, as a general rule, neutral salts gave larger amounts and higher degrees of polymerization than acids or acid salts, and have a further advantage in that they do not bring about as much color formation per unit of time or per unit of temperature as do acids or acid salts.

Rennhard reviewed the disadvantages of using mineral acid to promote polymerization of sugars to produce edible products in U.S. Pat. Nos. 3,766,165 and 3,876,794. Polysaccharides made from their constituent mono- or disaccharides using these acid catalysts were typically dark-colored and off-flavored. In addition to the caramelization and/or browning observed, mineral acids tend to catalyze the reverse reaction, depolymerization, forming acid reversion products that cut down on the efficiency of the forward reaction. Moreover, for food use, inedible catalysts, solvents and the like used in the preparatory procedures must be substantially completely removed from the products formed in the polymerization, and in some cases this was not possible as, for example, where the catalysts formed complexes with the products. Although a more recent publication suggested that hydrochloric acid may be desirable for condensing glucose under some circumstances (U.S. Pat. No. 4,965,354 to Yanaki and Muebuta), the patent did not disclose preparations incorporating a polyol with a saccharide in the polymerization mixture, or, as evidenced by enzymatic degradation studies (Table 6, column 9), formation of highly branched polydextrose for food applications.

Rennhard proposed that mineral acids be replaced with non-volatile, edible organic polycarboxylic acids for the manufacture of polysaccharides for food use ($M_n$, from 1500 to 18,000). He tested a variety of these acids as catalysts and cross-linking agents for the polymerization of glucose and maltose and found that he could obtain good products if the reaction were carried out in a melt at reduced pressure. He found that superior products could be obtained if he included a food acceptable polyol such as sorbitol in the saccharide-carboxylic acid reaction mixture prior to polycondensation. In addition, he reported that, by adjustment of the initial acid concentration, the reaction duration, and reaction temperature, two classes of polyglucose and polymaltose, soluble and insoluble, could be obtained simultaneously or separately.

Rennhard's use of food grade citric acid to make polydextrose eventually became a process identified by the Food and Drug Administration as safe (21 C.F.R. §172.841). Subsequent publications centered around ways of improving the product of the reaction. Rennhard's polydextrose possessed a slightly bitter taste which limited its utility in foods, so many disclosures were directed toward taste improvement. In U.S. Pat. No. 4,622,233 to Torres, for example, anhydroglucose (thought to contribute to the bitter taste), other impurities, and some color were removed from the polydextrose by treatment with a solvent and a food-approved bleaching agent. U.S. Pat. Nos. 4,948,596 and 4,956,458 to Bunick, et al., and Luo, et al., respectively disclosed purification of polydextrose by solvent extraction and reverse osmosis. EP-A-0380248, Guzek, et al., disclosed purifying polydextrose ($M_n$, from 1500 to 18,000) employing an ion exchange process for removing bound citric acid down to levels of 0.01 to 0.3 mole %. In U.S. Pat. Nos. 5,645,647 and 5,667,593, Guzek, et al., polydextrose was treated by ion exchange to make it substantially free of bitter-tasting residual compounds. A polydextrose having improved color, flavor, and decreased reactivity toward food ingredients having an amine functionality was prepared by hydrogenating the polymer product to remove reducing glucose groups (WO 92/14761 to Borden, et al.).

In U.S. Pat. No. 5,051,500, Elmore discloses the use of carboxylic acid catalysts with small amounts of an inorganic acid as a promoter.

All of the above-mentioned publications are incorporated by reference herein for all purposes as if fully set forth.

Because consumer interest in reduced- and low-calorie food and beverage products is growing, it would be desirable to have alternate processes for economically producing food grade polydextrose using other procedures.

SUMMARY OF THE INVENTION

It is an object of the invention to provide another process for the preparation of food grade polysaccharides.

It is a more specific object of the invention to provide a process for the production of edible polysaccharides using selected mineral acids, or a combination of mineral acids and organic acids, particularly in amounts and under conditions required to achieve a selected effect as set forth below.

It is a further object of the invention to provide a process for the production of edible polysaccharides, and particularly polydextrose, using very low levels of phosphoric acid.

It is an additional object of the invention to provide processes for modifying polydextrose and other polysaccharides prepared using certain mineral acid catalysis.

These and other objects are achieved by the present invention which provides a process for preparing highly branched polysaccharides by reacting a saccharide such as maltose, glucose, or other simple sugar, or a glucose-containing material such as hydrolyzed starch in the presence of a polyol such as sorbitol, glycerol, erythritol, xylitol, mannitol, galactitol, or mixtures thereof, typically at a level of from about 5 wt % to about 20 wt % polyol, in the presence of a sufficient amount of one or more mineral acid catalysts, or a mixture of a mineral acid catalyst and an organic acid, to form a polysaccharide suitable for food use, i.e., exhibiting low color and a low level of off-flavors.

Weight percent (wt %), for the purposes of the present specification, is based on the total weight of the polyol, saccharide and catalyst reactants.

In a first embodiment, the process of the invention utilizes very low amounts, preferably from about 0.0001 wt % to about 0.3 wt %, more preferably 0.1 wt % or less, still more preferably from about 0.000 wt % to 0.1 wt %, and especially from about 0.0002 wt % to about 0.06 wt %, of a catalyst component comprising one or more mineral acids selected from hydrochloric acid, sulfuric acid, sulfurous acid, thiosulfuric acid, dithionic acid, pyrosulfuric acid, selenic acid, selenious acid, phosphorous acid, hypophosphorous acid, pyrophosphoric acid, polyphosphoric acid, hypophosphoric acid, boric acid, perchloric acid, hypochlorous acid, hydrobromic acid, hydriodic acid and silicic acid; acidic alkali metal or alkaline earth metal salts of the above acids such as sodium bisulfate and sodium bisulfite; or mixtures of these acids (and/or acidic akali or alkaline earth metals salts) with phosphoric acid.

In a second embodiment, the process of the invention utilizes very low amounts, preferably from about 0.001 wt % to about 0.09 wt %, more preferably from about 0.006 wt % to about 0.09 wt %, and still more preferably from about 0.01 wt % to about 0.06 wt %, of a phosphoric acid catalyst optionally in combination with a polycarboxylic acid such as citric acid.

In a third embodiment, the process of the invention utilizes, in the catalyst component, a bleaching mineral acid in an amount and under conditions effective to reduce the color and/or off-flavor formation in the resulting polysaccharide. As examples of bleaching mineral acids are some of the above-mentioned mineral acids including sulfurous acid, selenious acid, perchloric acid, hypophosphorous acid and hypochlorous acid, as well as the acidic alkali metal and alkaline earth metal salts thereof such as sodium bisulfite. Typically, such bleaching mineral acids are used in amounts up to about 5.0 wt %, and more preferably up to about 1.0 wt %, as required to achieve the desired effect. Combinations of such bleaching mineral acids with other acid catalysts (including other mineral and/or polycarboxylic acid catalysts) are also part of this third embodiment.

In a fourth embodiment, the process of the invention utilizes, in the catalyst component, a metal chelating mineral acid in an amount and under conditions effective to reduce color and/or off-flavor formation in the resulting polysaccharide due to the presence of metal contaminants. As examples of metal chelating mineral acids are some of the above-mentioned mineral acids including polyphosphoric acid and pyrophosphoric acid, as well as the acidic alkali metal and alkaline earth metal salts thereof. Typically, such metal chelating mineral acids are used in amounts up to about 1.0 wt %, and more preferably up to about 0.5 wt %, as required to achieve the desired effect. Combinations of such metal chelating mineral acids with other acid catalysts (including other mineral and/or polycarboxylic acid catalysts) are also part of this fourth embodiment.

The product so formed by any of the above processes may be neutralized, further purified by ion exchange, size exclusion chromatography, membrane filtration, enzyme treatment and/or carbon treatment, and/or modified by hydrogenation. In some embodiments, the ion exchange purification step involves treatment with an anion exchange or mixed-bed resins.

DETAILED DESCRIPTION OF THE INVENTION

Figure 1:
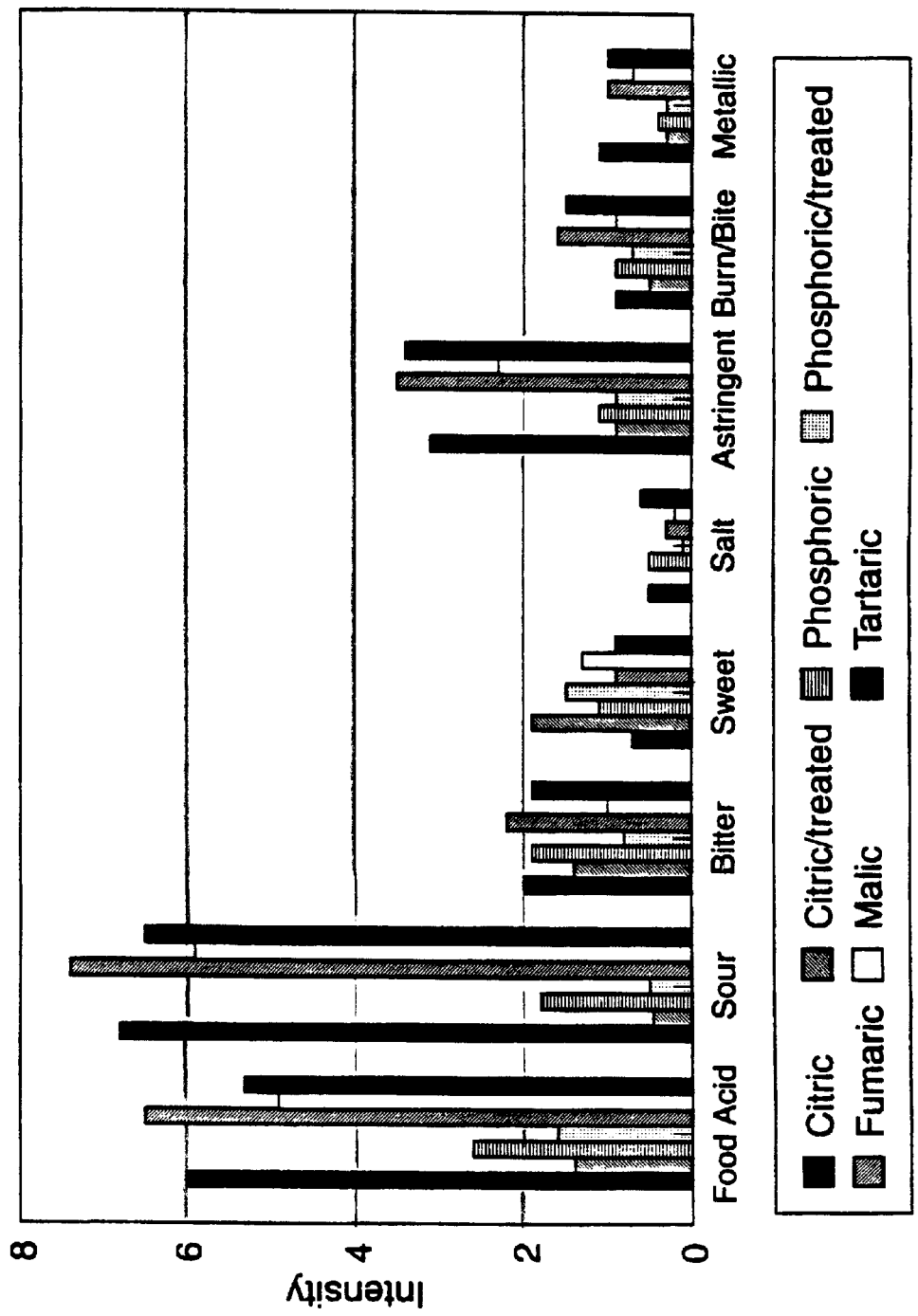
FIG. 1 is a bar graph summarizing data on the comparative taste of polydextrose made with different food acid catalysts: citric acid, a citric acid catalyst followed by an ion exchange purification step, phosphoric acid, phosphoric acid followed by an ion exchange purification step, fumaric acid, malic acid, and tartaric acid.

This invention is based upon the finding that food grade polysaccharides, and particularly food grade polydextrose, having desirable characteristics can be prepared using various mineral acid catalysts under appropriate conditions.

In the practice of the invention, edible polysaccharides are prepared by reacting a polyol with a sugar or sugar-containing materials in the presence of a mineral acid, a mineral acid mixture, or a mixture of a mineral acid with organic acid. Polyols include, but are not limited to, sorbitol, glycerol, erythritol, xylitol, mannitol, galactitol, and mixtures thereof; sorbitol is preferred in some embodiments. Typical embodiments utilize a polyol or polyols that are anhydrous, hydrated, or an aqueous solution. From about 5 wt % to about 20 wt %, preferably from about 5 wt % to about 15 wt %, polyols are typically employed in the reaction mixture. Some embodiments employ from about 8 wt % to about 12 wt % polyols. (Unless otherwise indicated, all percentages given herein are by weight, and are based on the weight at the particular stage of processing being described.)

Sugars include glucose, maltose, other simple sugars, glucose- and maltose-containing materials such as hydrolyzed starch, and mixtures thereof. In typical embodiments, the saccharide is anhydrous, hydrated or an aqueous solution. An advantage of the invention is that polysaccharides exhibiting slightly different properties can be obtained by varying the sugar component. As used herein, the terms polyglucose, polydextrose, polymaltose, and polysaccharide are intended to denominate polymeric materials in which the majority of the monomeric moieties are glucose, maltose, or other saccharide, as well as polymeric materials in which some of the glucose, maltose or other saccharide moieties are esterified with moieties derived from the polymerization activator.

In the practice of the invention, sugar and polyol are reacted together in the presence of an amount of a mineral acid catalyst, or a mixture of a mineral acid catalyst and an organic acid, under conditions sufficient to form a polysaccharide suitable for food use, i.e., one that has low color and a low level of off-flavors.

For example, in the first embodiment referred to above, the total amount of catalyst is very low and ranges from about 0.0001 wt % to about 0.3 wt %, preferably less than 0.1 wt %, of a mineral acid or a mineral acid mixture. At higher than the optimal acid concentrations, the reaction mixture can (depending on circumstances such as reaction conditions) produce products that are colored and off-flavored; use of lower than optimal concentrations may not reach an acceptable degree of polymerization. Optimal acid concentrations have the further advantage of providing product containing a minimal amount of catalyst, which eliminates or simplifies further purification steps.

Mineral acids include, but are not limited to, hydrochloric acid, phosphoric acid, sulfuric acid, sulfurous acid, thiosulfuric acid, dithionic acid, pyrosulfuric acid, selenic acid, selenious acid, phosphorous acid, hypophosphorous acid, pyrophosphoric acid, polyphosphoric acid, hypophosphoric acid, boric acid, perchloric acid, hypochlorous acid, hydrobromic acid, hydriodic acid and silicic acid, and acidic alkali metal and alkaline earth metal salts of the above acids such as sodium bisulfate and sodium bisulfite.

In some embodiments, hydrochloric acid or sulfuric acid are employed alone or in a mixture with one or more other acids. Hydrochloric acid is less preferred in large-scale production employing metal reaction vessels because it has a tendency to corrode the metal. Preferred organic acids are edible polycarboxylic acids including, but not limited to, citric, maleic, malic, glutaric, ascorbic, erythorbic, fumaric, tartaric, succinic, adipic, itaconic or terephthalic acids. The anhydrides of maleic, succinic, adipic, itaconic acid may also be used. Where organic acids are employed, citric acid is particularly preferred.

The first embodiment preferably employs from about 0.0001 wt % to about 0.3 wt % of a catalyst component consisting of hydrochloric acid, sulfuric acid, a mixture of these with each other, or a mixture of one or both of these with phosphoric acid.

In the second embodiment employing phosphoric acid, minimal levels are preferred so that the product does not require extensive purification, but the level must be adequate to promote the reaction. Surprisingly, very low acid levels have been found operable, e.g., levels well below the 0.1 wt % level disclosed by A. E. Staley (F.D.A. Food Additive Petition §172.841, *Fed. Reg.* 59: 36204 (1994)), the 0.1 to 1 wt % levels disclosed in Japanese Patent No. 05087083, or the 0.3 to 0.5 wt % levels disclosed in Japanese Patent No. 01012761. Phosphoric acid levels ranging between about 0.01 wt % to 0.09 wt % are preferred. These levels give acceptable reaction rates while minimizing dark colors, off-flavors, and acidity of products, and products can, if desired, be used directly in food without purification. Phosphoric acid levels of from about 0.01 to 0.06 wt % are preferred, and a level of about 0.03 wt % is particularly preferred.

In the third embodiment of the present invention, the catalyst employed is a bleaching mineral acid, which avoids a post-reaction bleaching treatment such as disclosed in previously mentioned U.S. Pat. No. 4,622,233. The amount of bleaching mineral acid used will be sufficient to reduce the color of the resulting product. The actual amounts of bleaching acid catalyst will vary depending upon a number of factors such as reaction temperature and the use of other catalysts, but it is preferred to utilize the minimum amount necessary to achieve the desired color effect so as to avoid, to the extent possible, other post-reaction purification processes such as mentioned above.

In the fourth embodiment of the present invention, the catalyst employed is a metal chelating mineral acid, which helps to avoid deleterious effects (such as color body and off-flavor formation) due to the presence of metal contaminants in the resulting products. The amount of metal chelating mineral acid used will be sufficient to reduce the free metal content of the resulting product. The actual amounts of metal chelating mineral acid will vary depending upon a number of factors such as reaction temperature and the use of other catalysts, but it is preferred to utilize the minimum amount necessary to achieve the desired free metal reduction effect so as to avoid, to the extent possible, other post-reaction purification processes such as mentioned above.

Optionally, in any of the process embodiments of the present invention, the resulting products can be purified by ion exchange, membrane filtration, carbon and other treatments known in the relevant art.

The reaction is typically carried out in an anhydrous melt. Dry powdered glucose or maltose, for example, is combined with the proper amount of acid, and the reactants are heated under reduced pressure. The duration of the reaction and the reaction temperature are interdependent variables in the practice of the invention. Preferred reaction temperatures vary from about 120° to about 200° C., preferably from about 145° to about 185° C. The precise temperature for the anhydrous melt polymerization depends on the initial ratio of glucose, maltose or other sugars to the acid which is used, the reaction time, and the proportion of soluble polysaccharides to insoluble cross-linked polysaccharides which is desired in the final product mixture.

Alternatively, reactants may initially be hydrated or in aqueous solution. In this case, water is typically removed from the reaction mixture by distillation at reduced pressure to promote the polymerization reaction.

The thermal exposure (reaction time and temperature) used in the production of polysaccharides according to the invention should be as low as possible, since discoloration, carmelization and degradation increase with prolonged exposure to high temperature. Fortunately, however, as the temperature of the polymerization is increased, the time required to achieve substantially complete polymerization decreases.

Preferred pressures do not exceed about 300 mm, e.g., from about $10^{-5}$ to 100–300 mm Hg, and can be obtained by use of a vacuum pump, a steam ejector, an aspirator or by other means. The vacuum is employed to exclude air from the polymerization and to remove the water of hydration and the water liberated in the polymerization reaction. The exclusion of air also minimizes decomposition and discoloration of the polysaccharides formed in the polymerization. A nitrogen purge may also be employed to exclude air.

The reaction product formed is a polysaccharide such as polymaltose or polydextrose. By "polydextrose" is meant glucose thermally polymerized in the presence of an acid that functions as a catalyst and a polyol that functions as a plasticizer and chain terminating agent. Polydextrose is a water-soluble, randomly bonded condensation polymer of glucose, containing minor amounts of bound sorbitol. Polydextrose is composed almost entirely of randomly cross-linked glucose polymers with all types of glucosidic bonds, the 1–6 bond predominating, and it contains some sorbitol groups. Along with the polymer itself, it may also contain small amounts of residual starting materials and their reaction products.

After the reaction is complete, the reaction mixture may be neutralized using small amounts of base. Even though very low amounts of acid are employed in certain embodiments, so that further purification may not be required, neutralization of polyglucoses or polymaltoses may be desirable for certain applications, despite the very low levels of acid catalyst which are employed. For example, where the polyglucoses are to be used in dietetic food containing whole milk, excess acid may tend to curdle the milk. Neutralization may be accomplished by adding alkaline substances such as carbonates or hydroxides of potassium, sodium, calcium, or magnesium to the polysaccharide or to an aqueous solution of the polysaccharide. Other materials which may be used to neutralize polyglucose or polymaltose include l-lysine, d-glucosamine, N-methyl glucamine and ammonium hydroxide. Other methods for reducing the acidity of polyglucose or polymaltose solutions are dialysis, ion exchange, and reverse osmosis.

As indicated above, the polysaccharide formed may be purified using ion exchange, membrane filtration, size exclusion chromatography, carbon treatment, enzyme treatment, bleaching, solvent extraction, or the like, or more than one treatment. Single treatments such as treatment with an anion exchange or a mixed-bed resin, are preferred for economic reasons. Soluble polyglucoses and polymaltoses, for example, may be decolorized by contacting an aqueous solution of the polysaccharide with activated carbon or charcoal. The polysaccharide may also be extracted with ethanol or methanol. Alternatively, the polysaccharide may be bleached. For example, polydextrose may be bleached using hydrogen peroxide (e.g., using 10 mg $H_2O_2$/gram polydextrose) or chlorine dioxide (e.g., using 0.5 mg $ClO_2$/gram polydextrose).

Ion exchange purifications are preferred in some embodiments and include, but are not limited to, slurrying the polydextrose with a resin or resin mixture, or by passing a polydextrose solution through a resin column. Preferred resins include anion exchange resins (either weakly basic or strongly basic), cation exchange resins or mixed-bed resins comprising an anion exchange resin and a cation exchange resin. Generally, for ion exchange purification, the polydextrose concentration is in the range of from about 10% to about 70%, temperature is in the range of about from 10° to about 80° C., the flow rate is in the range of about 0.1 to about 10 bed volumes per hour, and the pressure is in the range of about 1 to 10 atmospheres. For some resins, upper limits of temperature and pressure below the above-described limits may be needed to avoid chemical or physical decomposition of the resins. Examples are illustrated hereinafter. Preferred resins are employed in ion exchange purifications conducted at room temperature and atmospheric pressure. Ion exchange resin treatment removes the acid catalyst, some colored by-products and some off-flavors.

As demonstrated hereafter, ion exchange treatment of phosphoric acid-catalyzed polydextrose led to lower scores for undesirable organoleptic attributes. The decrease in bitterness observed for phosphoric acid-catalyzed polydextrose is particularly noteworthy, since the importance of bitterness and the effectiveness of ion exchange treatment for removal of bitterness were previously known only for citric acid-catalyzed polydextrose. It is an advantage of the invention that polydextrose prepared according to a method of the invention can provide a product exhibiting a bland taste and light color. It is another advantage of the invention that use of a weakly basic anion exchange resin purification to purify a polydextrose of the invention, for example, provided a product that exhibited a less metallic, less astringent, and less sour flavor compared to a polydextrose prepared using conventional means.

Polysaccharides formed by the method of the invention may be further modified. As described above, they may be bleached with sodium chlorite, hydrogen peroxide or other agent used for bleaching flour. Alternatively, they may be hydrogenated as set out in WO 92/14761 referred to above, and incorporated herein by reference. This typically involves exposing the polydextrose to hydrogen at elevated temperatures and pressures in the presence of a hydrogenation catalyst in a continuous or batch process. For example, a 30% to 60% polydextrose aqueous solution may be hydrogenated in the presence of Raney nickel at a pressure of from about 1000 psi to about 2500 psi and a temperature of from about 100° to about 160° C. for about 30 minutes to about 6 hours. The solution of hydrogenated polydextrose is typically then exposed to a cation exchange resin to remove the dissolved nickel.

Alternatively, polydextrose may be reduced with a hydride donor. For example, polydextrose prepared according to the invention may be reduced in a 30% to 60% aqueous solution having a pH of about 9 to about 12 at an ambient pressure at about 5° to 80° C. for about 30 minutes to 12 hours using sodium borohydride and potassium borohydride as hydride donors. Using either method, the polydextrose is improved for certain purposes because it has substantially no reactive reducing groups that can cause undesirable color and bitter taste.

As a further purification step, unmodified or modified polydextroses of the invention may, in some embodiments, be treated with enzymes to improve color, color stability, taste, viscosity, stability, and the like, as previously described (U.S. Pat. Nos. 5,424,418, 5,493,014, and 5,573, 794 to Duflot and Can. Pat. No. 2,086,207 to Caboche). In typical embodiments, the specificity of various bacterial or fungal glycosidases or oxidases are employed either to preferentially cleave bonds found in the unwanted products of side reactions formed during the course of the polymerization reaction, or to remove unwanted low molecular weight products. Use of glucose oxidase, for example, has been suggested to remove glucose from polysaccharide products, decolorizing them, removing some burnt acid tastes, and lowering their caloric content (U.S. Pat. No. 5,573,794). Typical enzyme purification treatments involve the addition of enzyme to a solution of polysaccharide product followed by an incubation period, or contact of a polysaccharide product solution to enzymes attached to a support. Useful enzymes include, but are not limited to, glucose oxidase, amylase, β-glucosidase, amyloglucosidase, and combinations thereof.

Polydextroses available in commerce are water-soluble, typically exhibit an average molecular weight of from about 1,000 to about 3,000 depending on the degree of polymerization, purity and method used to determine molecular weight, and exhibit a bland taste, with no aftertaste. The invention can be utilized to prepare like materials, as well as polysaccharides with average molecular weights above and below this range. Preferred polydextroses prepared according to the invention exhibit a glucose content of less than about 4.0%, preferably less than about 3.5%, and an American Public Health Association (APHA) color of 300 or less.

It is an advantage of the invention that the degree of polymerization as well as the reaction kinetics can be controlled by changing the ratios of the reactants, reaction time, temperature, pressure, and amount of acid catalyst. Optimal levels for bland, nearly colorless polydextrose are given above. Comparative examples illustrating preparations under different conditions are given below.

It is another advantage of certain embodiments of the invention that, because the amounts of catalyst consumed are low and the catalyst is inexpensive, the overall process is economical and provides polysaccharides that do not require extensive purification procedures. For example, polydextroses can be prepared according to the invention with less than the 0.1 wt % phosphoric acid suggested by A. E. Staley in F.D.A. Food Additive Petition §172.841 (1994). In some embodiments, the acid level is so low that the products formed using the process can be used without neutralization or other purification procedures.

It is a further advantage of the invention that polydextroses made according to the invention exhibit a taste superior to polydextrose made with other acids such as citric, filmaric, malic, or tartaric, or higher levels of mineral acid. Comparative tests are set out in the Examples below.

EXAMPLES

The following examples are presented to further illustrate and explain the present invention and should not betaken as limiting in any regard. Unless otherwise indicated, all parts and percentages are by weight and are based at the stage of processing being described, color in a 10% aqueous solution is reported using the American Public Health Association (APHA) scale wherein zero is colorless, and molecular weight profiles are estimated using high performance liquid chromatography (HPLC).

Example 1

Control Polydextrose Made Using Citric Acid as Catalyst

A dry blend containing an 89:10:1 ratio, by weight, of dextrose monohydrate, sorbitol, and citric acid was continuously fed to a reactor operating at an average temperature of approximately 170–180° C. and at reduced pressure. The feed rate was adjusted to achieve at least 96% polymerization as determined by analysis of residual glucose. The product had a slight bitter taste.

Example 2

Catalysis by Phosphoric Acid and Organic Acids

Dry blends containing an 89:10 ratio by weight of dextrose and sorbitol and low level of an acid catalyst, as indicated in the following table, were heated for 5 minutes at about 175° C. to melt the reactants, then polymerized under partial vacuum (100 mm Hg) at 175° C. for a time sufficient to give a residual glucose level below 3.5% by weight. APHA color was determined in 10% aqueous solution for each product.

| Acid catalyst | Weight percentage of blend | Reaction time, minutes | APHA color of a 10% solution |
| --- | --- | --- | --- |
| Citric | 1 | 8 | 175 |
| Fumaric | 1 | 9 | 150 |
| Tartaric | 1 | 9 | 175 |
| Malic | 1 | 14 | 200 |
| Phosphoric | 0.1 | 8 | 200 |

The citric and phosphoric acid-catalyzed products were treated with Rohm and Haas Amberlite IRA 93® resin. IRA 93 is a macroreticular resin containing tertiary amine functionality on a styrene-divinylbenzene matrix. The resulting solutions were diluted to 10% concentration and evaluated for organoleptic attributes by a trained panel. The untreated products were evaluated in the same way.

In this example, taste was evaluated by a trained 7-member panel by descriptive analysis, a common method of evaluating organoleptic attributes. Panelists were given coded samples to quantify flavor attributes using a scale of 1–15. Flavor standards were available for panelists to check intensities. Results are given in FIG. 1. As expected from the lower level of acidity, polydextrose prepared using 0.1% phosphoric acid was perceived as significantly less sour than polydextrose prepared using 1% citric, fumaric, malic, or tartaric acid, but bitterness was not significantly reduced. However, the ion exchange-treated materials were not only significantly less sour, which is the expected result of removal of residual acid (citric or phosphoric), but they were also significantly less bitter.

Example 3

Catalysis by 1% Phosphoric Acid

A blend containing an 89:10 weight ratio of dextrose to sorbitol and 1.18% phosphoric acid was heated to about 150° C. under partial vacuum (500 mm Hg) for 20 minutes. The product contained 2.8% glucose and had an APHA color of 1500 in 10% aqueous solution.

Example 4

Catalysis by Various Levels of Phosphoric Acid

Dry blends containing an 89:10 weight ratio of dextrose to sorbitol and low level of phosphoric acid, as indicated in the following table, were heated to 150–190° C. under partial vacuum (20–25 mm Hg) for times sufficient to give residual glucose levels of about 2–3% by weight. APHA color was determined in 10% aqueous solution for each product. Organoleptic attributes were directly compared with those of Litesse® (ion exchange purified citric acid catalyzed polydextrose manufactured by Cultor, Inc.) in 10% aqueous solution.

| Weight % $H_3PO_4$ | Reaction time, min. | APHA color | Organoleptic attributes as compared with Litesse | | | |
|---|---|---|---|---|---|---|
| | | | Sweet | Sour | Salt | Bitter |
| 0.59 | 6 | 175 | Same | Percept. more | Same | Slightly more |
| 0.25 | 8 | 175 | Percept. more | Same | Same | Percept. more |
| 0.15 | 2 | 55 | Percept. more | Same | Same | Percept. more |
| 0.06 | 4–7 | 70 | Percept. more | Same | Same | Percept. more |
| 0.03 | 10–11 | 50–125 | Percept. more | Same | Same | Same |

Example 5

Purification of Phosphoric Acid-Catalyzed Polydextrose with Weakly Basic Anion Exchange Resin Each of the products of Example 4 was purified by passage of a dilute aqueous solution through a column of Amberlite IRA 93® resin. IRA 93 is a macroreticular resin containing tertiary amine functionality on a styrene-divinylbenzene matrix. The material remaining on the column was removed by elution with water. Organoleptic attributes of the purified solution and the wash were directly compared with those of Litesse® (ion exchange purified citric acid catalyzed polydextrose manufactured by Cultor, Inc.) in 10% aqueous solution. Results are tabulated below.

| Weight percent phosphoric acid | Organoleptic attributes as compared with Litesse | | | |
|---|---|---|---|---|
| | Sweet | Sour | Salt | Bitter |
| Purified solutions | | | | |
| 0.59 | Slightly less | Slightly less | No difference | Slightly Less |
| 0.25 | Slightly more | Slightly less | No difference | Slightly Less |
| 0.15 | Slightly more | No difference | No difference | No difference |
| 0.06 | No difference | Slightly less | No difference | No difference |
| 0.03 | Slightly more | No difference | No difference | No difference |
| Wash | | | | |
| 0.59 | No difference | Percept. more | No difference | Slightly more |
| 0.25 | Percept. more | No difference | No difference | Percept. more |
| 0.15 | No difference | No difference | No difference | No difference |
| 0.06 | No difference | No difference | No difference | No difference |
| 0.03 | Slightly more | No difference | Percept. more | Percept. more |

Example 6

Purification of Phosphoric Acid-Catalyzed Polydextrose with Mixed Bed Ion Exchange Resin Each of the products of Example 4 was purified by passage of a dilute aqueous solution through a column of a mixed bed ion exchange resin containing a 2:1 mixture of Dowex 88® cation exchange resin and Dowex 22® anion exchange resin. Dowex 22 is a macroreticular resin containing quaternary dimethylethanolamine functionality on a styrene-divinylbenzene matrix. Dowex 88 is a macroreticular resin containing sulfonate functionality on a styrene-divinylbenzene matrix. The material remaining on the column was removed by elution with water. Organoleptic attributes of the purified solution and the wash were directly compared by a test panel with those of Litesse® (ion exchange purified citric acid catalyzed polydextrose manufactured by Cultor, Inc.) in 10% aqueous solution. Results are tabulated below. In addition to the tabulated ratings, some panelists reported an off-taste in the column wash from purification of polydextrose made with the three lowest levels of phosphoric acid (0.15, 0.06, and 0.03%), described as a strong musty or rubbery taste.

| Weight percent phosphoric acid | Organoleptic attributes as compared with Litesse ||||
|---|---|---|---|---|
| | Sweet | Sour | Salt | Bitter |
| Purified solutions |||||
| 0.59 | Slightly more | Slightly less | No difference | Slightly Less |
| 0.25 | No difference | No difference | No difference | No difference |
| 0.15 | Percept. more | No difference | No difference | Percept. more |
| 0.06 | No difference | No difference | No difference | Percept. more |
| 0.03 | No difference | No difference | No difference | Percept. more |
| Wash |||||
| 0.59 | No difference | No difference | No difference | No difference |
| 0.25 | Sample not recovered ||||
| 0.15 | More/pronounced | No difference | No difference | Slightly more |
| 0.06 | More/pronounced | No difference | No difference | No difference |
| 0.03 | More/pronounced | No difference | No difference | No difference |

Example 7

Catalysis by 0.005% Sulfuric Acid

A mixture of 267 grams of dextrose monohydrate, 30 grams of sorbitol, and 15 milligrams of concentrated sulfuric acid (97% $H_2SO_4$) was heated to 150–160° C. under partial vacuum, with stirring, for approximately 10 to 15 minutes. The product contained 3.1% glucose and had an APHA color of 125 in 10% aqueous solution. The taste was bland, with no detectable bitter aftertaste.

Example 8

Catalysis by 0.002% Hydrochloric Acid

A mixture of 267 grams of dextrose monohydrate, 30 grams of sorbitol, and 15 milligrams of concentrated hydrochloric acid (38% HCl) was heated to 150–160° C. under partial vacuum, with stirring, for approximately 10 to 15 minutes. The product contained 2.9% glucose and had an APHA color of 75 in 10% aqueous solution. The taste was bland, with no detectable bitter aftertaste.

Example 9

Catalysis by Citric Acid Plus Various Mineral Acids

Mixtures of 267 grams of dextrose monohydrate, 30 grams of sorbitol, and the citric acid plus mineral acid catalyst combinations noted below were heated to 150–165° C. under partial vacuum, with stirring, for approximately 10 to 15 minutes. APHA color was determined in 10% aqueous solution for each product. The taste of all products was bland, with no detectable bitter aftertaste.

| Weight percent Citric acid | Mineral acid | Weight percent mineral acid | Weight percent residual dextrose | APHA color |
|---|---|---|---|---|
| 0.33 | Phosphoric | 0.0057 | 1.1 | 175 |
| 0.33 | Sulfuric | 0.0065 | 2.1 | 150 |
| 0.33 | Hydrochloric | 0.0026 | 3.9 | 75 |
| 1.0 | Phosphoric | 0.0057 | 3.1 | 100 |
| 1.0 | Sulfuric | 0.006 | 1.2 | 500 |
| 1.0 | Sulfuric | 0.06 | 2.2 | 150 |
| 1.0 | Hydrochloric | 0.0013 | 2.6 | 200 |
| 1.0 | Hydrochloric | 0.0025 | 3.3 | 175 |
| 1.0 | Hydrochloric | 0.0038 | 2.1 | 200 |
| 1.0 | Hydrochloric | 0.0051 | 2.6 | 250 |

Example 10

Polymerization of Liquid Starting Materials with Various Levels of Phosphoric Acid Catalyst Mixtures of various liquid dextrose and sorbitol starting materials in amounts calculated to give an 89:10 ratio of dextrose to sorbitol on an anhydrous basis, and a low level of phosphoric acid, as indicated in the following table, were heated to 150–160° C. under slightly reduced pressure (approximately 600 mm Hg) with stirring, for times sufficient to give residual glucose levels of approximately 3% by weight. APHA color was determined in 10% aqueous solution for each product. The taste of all products was bland, with no detectable bitter aftertaste.

| Dextrose source | Sorbitol source | Weight percent phosphoric acid | Reaction time, min. | Weight percent residual glucose | APHA color |
|---|---|---|---|---|---|
| Cerelose | ICI Liquid | 0.21 | 3 | 3.4 | 200 |
| Clintose-L | ICI Liquid | 0.15 | 7 | 3.1 | 125 |
| Clintose-L | ICI Liquid | 0.13 | 4 | 3.1 | 175 |
| Staleydex 130 | ADM Liquid | 0.13 | 6 | 3.6 | 125 |
| Staleydex 130 | ADM Liquid | 0.13 | 8 | 2.6 | 175 |
| Staleydex 130 | ADM Liquid | 0.10 | 10 | 2.9 | 175 |

Descriptions of starting materials
Cerelose: 70% dextrose solution, Corn Products Company
Clintose-L: 70% dextrose solution, Archer Daniels Midland Co.
Staleydex 130: 70% dextrose solution, A. E. Staley Co.
ICI liquid: 70% sorbitol solution, ICI
ADM liquid: 70% sorbitol solution, Archer Daniels Midland Co.

Example 11

Polymerization of Liquid Starting Materials with Citric Acid Plus Various Levels of Hydrochloric Acid Mixtures of various liquid dextrose and liquid and solid sorbitol starting materials in amounts calculated to give an 89:10 ratio of dextrose to sorbitol on an anhydrous basis, citric acid equal to 1% by weight of the total solids content of the mixtures, and low levels of hydrochloric acid, as indicated in the following table, were heated to 150–166° C. under slightly reduced pressure (500–610 mm Hg) with stirring, for times sufficient to give residual glucose levels of approximately 2–4% by weight. APHA color was determined in 10% aqueous solution for each product. The taste of all products was bland, with no detectable bitter aftertaste.

| Glucose source | Sorbitol source | Weight percent HCl | Reaction time, min. | Weight percent residual glucose | APHA color |
|---|---|---|---|---|---|
| CPC hydrate | Liquid | 0.0002 | 8 | 3.5 | 150 |
| CPC hydrate | Liquid | 0.0004 | 7 | 2.4 | 175 |
| Clintose-L | ADM granular | 0.0009 | 48 | 2.5 | 200 |
| CPC hydrate | Liquid | 0.0011 | 6 | 2.3 | 175 |
| Clearsweet 95 | ADM granular | 0.0013 | 17 | 3.0 | 150 |
| Clearsweet 95 | ADM granular | 0.0019 | 25 | 2.8 | 150 |
| CPC hydrate | Liquid | 0.0022 | 10 | 3.4 | 200 |

Descriptions of starting materials
CPC hydrate: experimental 70% dextrose solution from Corn Products Company, somewhat less pure than Cerelose
Clintose-L: 70% dextrose solution, Archer Daniels Midland Co.
Clearsweet 95: 70% solution of 95 D. E. dextrose, Cargill
Liquid sorbitol: 70% solution
ADM granular: anhydrous sorbitol, Archer Daniels Midland Co.

The above description is for the purpose of illustrating and not limiting the present invention, and teaching the person of ordinary skill in the art how to practice the invention. It is not intended to detail all those obvious modifications and variations of it which will become apparent to the skilled worker upon reading the description. It is intended, however, that all such obvious modifications and variations be included within the scope of the present invention as defined in the appended claims. The claims are meant to cover the claimed components and steps in any sequence which is effective to meet the objectives there intended, unless the context specifically indicates the contrary.

The patents and papers cited above are hereby incorporated herein by reference in their entireties.

What is claimed is:

1. A process for preparing an edible polysaccharide comprising the step of reacting a polyol selected from the group consisting of sorbitol, glycerol, erythritol, xylitol, mannitol, galactitol, and mixtures thereof, with a saccharide selected from the group consisting of glucose, other simple sugars, hydrolyzed starch, and mixtures thereof, in the presence of from about 0.0001 wt % to about 0.3 wt % of a catalyst component consisting of a mineral acid selected from the group consisting of hydrochloric acid, sulfuric acid, sulfurous acid, thiosulfuric acid, dithionic acid, pyrosulfuric acid, selenic acid, selenious acid, phosphorous acid, hypophosphorous acid, pyrophosphoric acid, polyphosphoric acid, hypophosphoric acid, boric acid, perchloric acid, hypochlorous acid, hydriodic acid and silicic acid, acidic alkali metal or alkaline earth metal salts of the above mineral acids, mixtures thereof, and mixtures thereof with phosphoric acid, wherein the reaction is conducted under anhydrous melt polymerization conditions to result in a water soluble product exhibiting an APHA color of 300 or less.

2. The process of claim 1, wherein the mineral acid is selected from hydrochloric acid, sulfuric acid, acidic alkali metal or alkaline earth metal salts of the above mineral acids, mixtures thereof, and mixtures thereof with phosphoric acid.

3. The process of claim 1, wherein the catalyst component is present in an amount of from about 0.1 wt % or less.

4. The process of claim 3, wherein the catalyst component is present in an amount of from about 0.0002 wt % to about 0.06 wt %.

5. The process of claim 1, wherein the polyol is sorbitol and the saccharide is glucose.

6. A process for preparing an edible polysaccharide comprising the step of reacting a polyol selected from the group consisting of sorbitol, glycerol, erythritol, xylitol, mannitol, galactitol, and mixtures thereof, with a saccharide selected from the group consisting of glucose, hydrolyzed starch, and mixtures thereof, in the presence of from about 0.001 wt % to about 0.09 wt % of a phosphoric acid catalyst, wherein the reaction is conducted under anhydrous melt polymerization conditions.

7. The process of claim 6, wherein the reaction is conducted in the presence of from about 0.006 wt % to about 0.09 wt % of the phosphoric acid catalyst.

8. The process of claim 7, wherein the reaction is conducted in the presence of from about 0.01 wt % to about 0.06 wt % of the phosphoric acid catalyst.

9. The process of claim 6, wherein the reaction is conducted in the further presence of a polycarboxylic acid catalyst.

10. The process of claim 6, wherein the polyol is sorbitol and the saccharide is glucose.

11. The process of claim 6, wherein the polyol, saccharide and acid catalyst are reacted under conditions to result in a water soluble product exhibiting an AHPA color of 300 or less.

12. A process for preparing an edible polysaccharide comprising the step of reacting a polyol selected from the group consisting of sorbitol, glycerol, erythritol, xylitol, mannitol, galactitol, and mixtures thereof, with a saccharide selected from the group consisting of glucose, other simple sugars, hydrolyzed starch, and mixtures thereof, in the presence of a bleaching mineral acid in an amount effective to reduce the color of the resulting polysaccharide, wherein the reaction is conducted under anhydrous melt polymerization conditions.

13. The process of claim 12, wherein the bleaching mineral acid is selected from the group consisting of sulfurous acid, selenious acid, hypophosphorous acid, perchloric acid and hypochlorous acid, acidic alkali metal salts and alkaline earth metal salts of the above acids, and mixtures thereof.

14. The process of claim 12, wherein the bleaching mineral acid is used in an amount up to about 5.0 wt %.

15. The process of claim 12, wherein the polyol is sorbitol and the saccharide is glucose.

16. A process for preparing an edible polysaccharide comprising the step of reacting a polyol selected from the group consisting of sorbitol, glycerol, erythritol, xylitol, mannitol, galactitol, and mixtures thereof, with a saccharide selected from the group consisting of glucose, other simple sugars, hydrolyzed starch, and mixtures thereof, in the presence of a metal chelating mineral acid in an amount effective to reduce color and/or off-flavor formation in the resulting polysaccharide due to the presence of metal contaminants, wherein the reaction is conducted under anhydrous melt polymerization conditions.

17. The process of claim 16, wherein the metal chelating mineral acid is selected from the group consisting of polyphosphoric acid and pyrophosphoric acid, acidic alkali metal salts and alkaline earth metal salts of the above acids, and mixtures thereof.

18. The process of claim 16, wherein the metal chelating mineral acid is used in an amount up to about 1.0 wt %.

19. The process of claim 16, wherein the polyol is sorbitol and the saccharide is glucose.

* * * * *